(12) United States Patent
Gooch

(10) Patent No.: US 10,746,215 B2
(45) Date of Patent: Aug. 18, 2020

(54) BLADE-AND-SLOT JOINTS THAT UNITE COMPOSITE PANELS VIA INTERNAL BLADES

(71) Applicant: The Boeing Company, Chicago, IL (US)

(72) Inventor: Paul Gooch, Everett, WA (US)

(73) Assignee: The Boeing Company, Chicago, IL (US)

(*) Notice: Subject to any disclaimer, the term of this patent is extended or adjusted under 35 U.S.C. 154(b) by 535 days.

(21) Appl. No.: 15/587,728

(22) Filed: May 5, 2017

(65) Prior Publication Data
US 2018/0320722 A1 Nov. 8, 2018

(51) Int. Cl.
*F16B 11/00* (2006.01)
*B29C 65/48* (2006.01)
(Continued)

(52) U.S. Cl.
CPC ............ *F16B 11/006* (2013.01); *B29C 65/48* (2013.01); *B29C 65/564* (2013.01); *B29C 66/01* (2013.01); *B29C 66/0224* (2013.01); *B29C 66/112* (2013.01); *B29C 66/114* (2013.01); *B29C 66/21* (2013.01); *B29C 66/43441* (2013.01); *B29C 66/721* (2013.01); *B29C 66/723* (2013.01); *B29C 66/72525* (2013.01); *B64C 1/066* (2013.01); *B64F 5/10* (2017.01);
(Continued)

(58) Field of Classification Search
CPC .... F16B 7/02; F16B 7/025; F16B 7/18; F16B 7/22; F16G 11/042; F16G 11/048; B29C 66/561; B29C 66/562; B29C 66/524; B29C 66/526; B29C 66/534; B29C 66/5344; B29C 70/00; B29C 70/06; B29C 67/00; B29C 67/14
See application file for complete search history.

(56) References Cited

U.S. PATENT DOCUMENTS 2,505,789 A 5/1950 Norquist
3,539,425 A 11/1970 Marburg
(Continued)

FOREIGN PATENT DOCUMENTS

DE 1813661 12/1971
EP 0275621 A1 7/1988
(Continued)

OTHER PUBLICATIONS

Biscuit Joiner; Wikipedia; Feb. 11, 2017.
(Continued)

*Primary Examiner* — Daniel J Wiley
(74) *Attorney, Agent, or Firm* — Duft & Bornsen, PC

(57) ABSTRACT

Systems and methods are provided for blade-and-slot panel affixation. One embodiment is a method. The method includes cutting a first slot into a first composite panel that includes a core between two facesheets. The first slot penetrates through the core of the first composite panel. The method also includes cutting a second slot into a second composite panel that includes a core between two facesheets. The second slot penetrates through a facesheet of the second composite panel as well as the core of the second composite panel. The method further includes inserting a blade into the first slot, and inserting the blade into the second slot.

39 Claims, 10 Drawing Sheets

(51) Int. Cl.
    *B29C 65/00*     (2006.01)
    *B64C 1/06*     (2006.01)
    *B64F 5/10*     (2017.01)
    *B29C 65/56*     (2006.01)
    *B29L 7/00*     (2006.01)
    *F16B 5/00*     (2006.01)
    *F16B 5/06*     (2006.01)

(52) U.S. Cl.
    CPC ..... *B29C 66/7212* (2013.01); *B29L 2007/002* (2013.01); *F16B 5/002* (2013.01); *F16B 5/0614* (2013.01)

(56) References Cited

U.S. PATENT DOCUMENTS

| | | | | |
|---|---|---|---|---|
| 5,680,934 | A * | 10/1997 | Jaegers | B65D 65/44 206/586 |
| 6,164,477 | A * | 12/2000 | Druckman | A47B 43/02 220/7 |
| 7,887,249 | B2 | 2/2011 | Schmitz | |
| 7,963,038 | B2 | 6/2011 | Schmitz | |
| 8,961,059 | B2 | 2/2015 | Reeves et al. | |
| 8,973,241 | B1 | 3/2015 | Gooch | |
| 9,835,189 | B2 * | 12/2017 | Engquist | B29C 66/322 |
| 2004/0065041 | A1 * | 4/2004 | Staats | B32B 3/02 52/592.1 |

FOREIGN PATENT DOCUMENTS

| | | |
|---|---|---|
| EP | 1614525 A1 | 1/2006 |
| EP | 2040980 B1 | 10/2011 |
| GB | 1205869 | 9/1970 |
| GB | 2081678 A | 2/1982 |
| WO | 9410406 | 5/1994 |
| WO | 0194236 A1 | 12/2001 |
| WO | 2008105789 A2 | 9/2008 |
| WO | 2011151737 A2 | 12/2011 |

OTHER PUBLICATIONS

Lamello System; Pioneering wood joining.
European Search Report; Application 18169568.5-1014; dated Sep. 27, 2018.

* cited by examiner

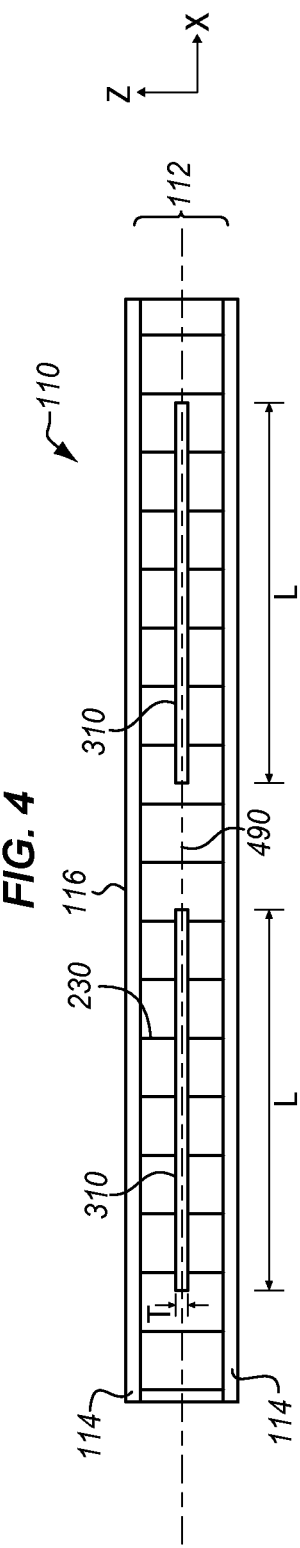
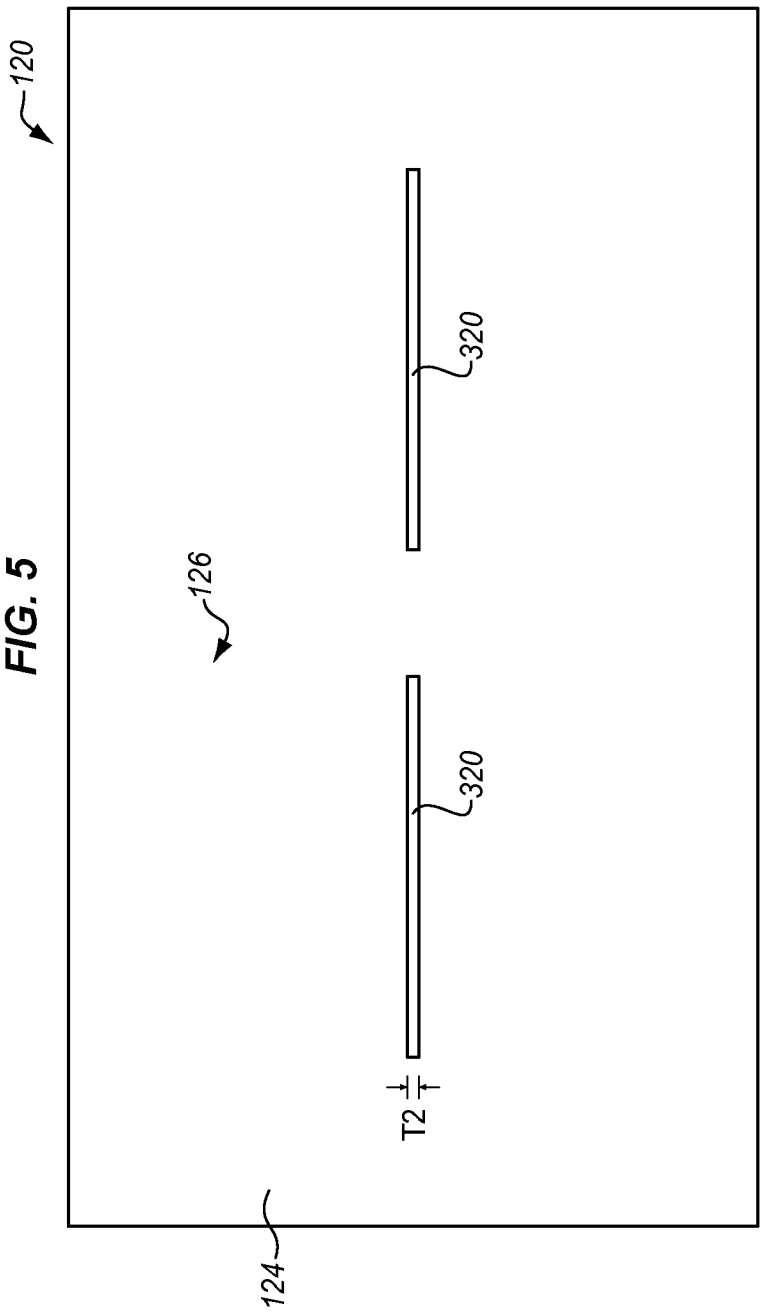

BLADE-AND-SLOT JOINTS THAT UNITE COMPOSITE PANELS VIA INTERNAL BLADES

FIELD

The disclosure relates to the field of composite materials, and in particular, to joining composite panels.

BACKGROUND

Composite materials (e.g., carbon fiber, fiberglass, etc.) are used to fabricate a variety of mechanical components. When creating a particularly complex component, it may be beneficial to assemble the component from multiple composite panels. However, it remains a complicated process to unite composite panels with the desired structural strength. This is particularly true with regards to composite panels that utilize a core. In an aerospace environment, it may also be particularly desirable to utilize smaller amounts of adhesive when forming a joint. Using less adhesive to form a joint beneficially reduces the weight of that joint, which improves fuel efficiency of a corresponding aircraft.

Thus, those of ordinary skill in the art continue to seek out enhancements to the techniques by which composite panels are joined.

SUMMARY

Embodiments described herein provide for blade-and-slot systems in which slots are cut into a partially hollow core of a composite panel. The slots may extend perpendicular to a direction of walls within the core of the composite panel. A blade may be inserted and glued into a slot at a face/end of each of two different panels. The bonding process may for example be performed as a single event with the blade placed in both panels before an adhesive is cured. The blades are internal and hence are not visible after installation. These systems for blade-and-slot joining of panels exhibit high levels of mechanical strength, and enable composite panels to be joined together in a straightforward manner that also does not spill adhesive onto the exterior of the composite panels which are being united. That is, the blade-and-slot systems described herein enhance ease of assembly, result in a minimal amount of adhesive clean up, and add minimal weight. Hence, joints between the panels remain aesthetically pleasing, strong, and fire resistant, which is highly beneficial for aircraft interiors.

One embodiment is a method that includes cutting a first slot into a first composite panel that includes a core between two facesheets. The first slot penetrates through the core of the first composite panel. The method also includes cutting a second slot into a second composite panel that includes a core between two facesheets. The second slot penetrates through a facesheet of the second composite panel as well as the core of the second composite panel. The method further includes inserting a blade into the first slot, and inserting the blade into the second slot.

A further embodiment is an apparatus that includes a first composite panel and a second composite panel. Each composite panel comprises a first facesheet that extends laterally across a top of the panel, a second facesheet that extends laterally across a bottom of the panel, and a core that separates the first facesheet and the second facesheet. The apparatus also includes a blade that occupies a first slot that penetrates laterally through the core of the first composite panel between the facesheets of the first composite panel. The blade further occupies a second slot that penetrates vertically through the first facesheet of the second composite panel into the core of the second composite panel. The apparatus also includes adhesive that secures the blade into the first slot and the second slot.

A further embodiment is a system. The system includes a first composite panel and a second composite panel. A first facesheet extends laterally across a top of the panel. A second facesheet extends laterally across a bottom of the panel. A core separates the first facesheet and the second facesheet. A first slot penetrates laterally through cells of the core of the first composite panel between the facesheets of the first composite panel, has a thickness less than a thickness of the first composite panel, and extends a predetermined depth into the first composite panel. A second slot penetrates vertically through the first facesheet and the core of the second composite panel into cells of the second composite panel, and extends a predetermined depth into the composite panel. A blade is dimensioned for insertion into the first slot and the second slot.

A further embodiment is an apparatus. The apparatus includes a first composite panel. The first composite panel includes a first facesheet that extends laterally across a top of the first composite panel, a second facesheet that extends laterally across a bottom of the first composite panel, and a first core separating the first facesheet and the second facesheet. A portion of the first core extends beyond the first facesheet and the second facesheet at an end of the first composite panel, and extends a predetermined depth beyond the end of the panel. A second composite panel includes a third facesheet that extends laterally across a top of the second composite panel, a fourth facesheet that extends laterally across a bottom of the second composite panel, and a second core separating the third facesheet and the fourth facesheet. A slot penetrates through the third facesheet as well as penetrating through the second core. The portion of the first core is inserted into the slot and affixed to the slot via adhesive.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 4 is a bottom view of a first composite panel of FIG. 3 in an exemplary embodiment.

FIG. 5 is a top view of a second composite panel of FIG. 3 in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
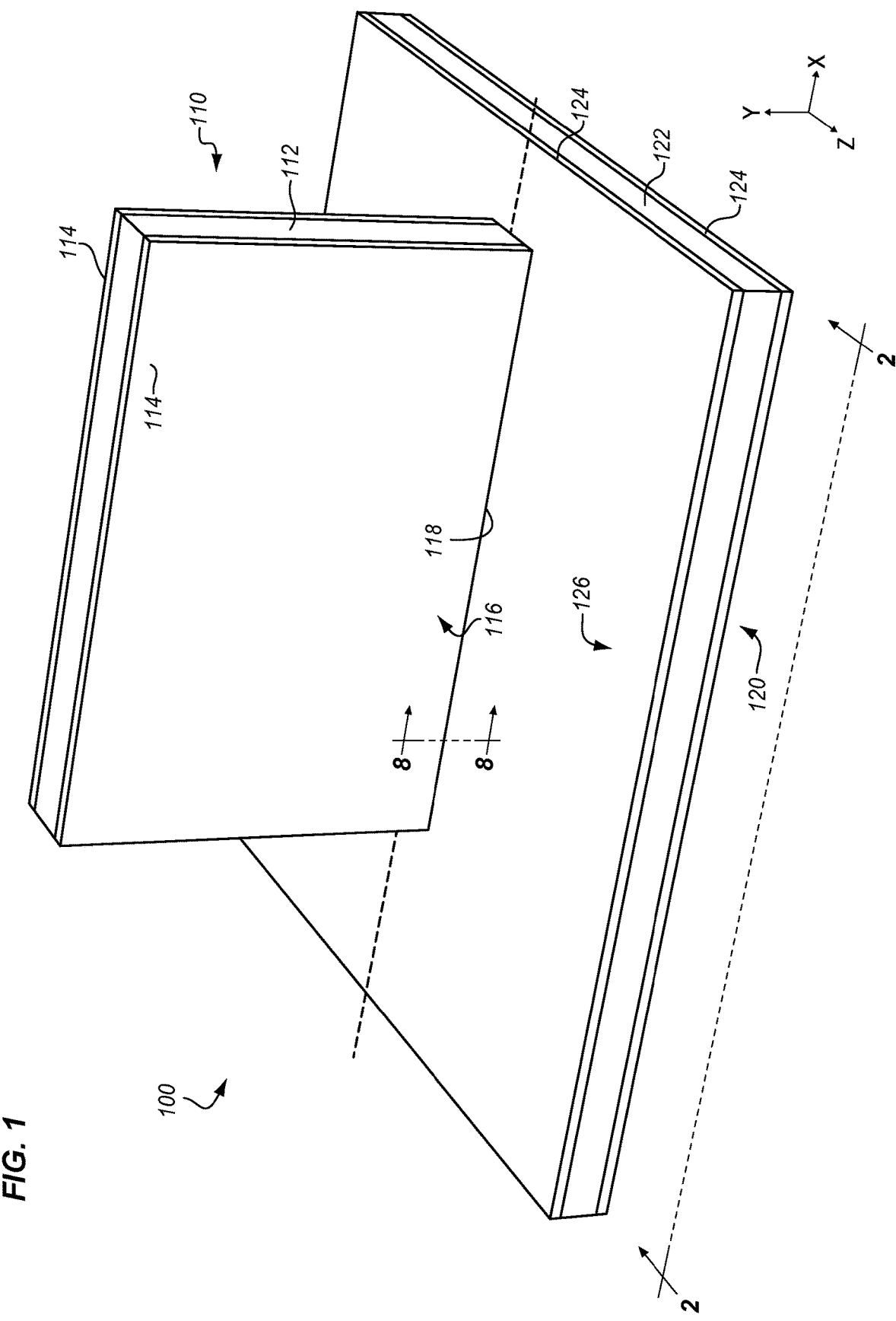
FIG. 1 is a perspective view of two composite panels that have been joined via a blade-and-slot system in an exemplary embodiment.

FIG. 1 is a perspective view diagram of two composite panels (110, 120) that have been joined via a blade-and-slot system 100 in an exemplary embodiment. FIG. 1 depicts first composite panel 110, which includes core 112 and facesheets 114. Surface 116 of facesheet 114 is also illustrated, as is end 118 which contacts second composite panel 120. Second composite panel 120 includes core 122 and facesheets 124. The facesheets (114, 124) extend (e.g., laterally across a top (or bottom) of) their corresponding core (112, 122), and resist in-plane forces applied to their corresponding composite panel (110, 120). First composite panel 110 is joined to second composite panel 120. In this arrangement, end 118 of first composite panel 110 contacts surface 126 of facesheet 124 of second composite panel 120.

Figure 2:
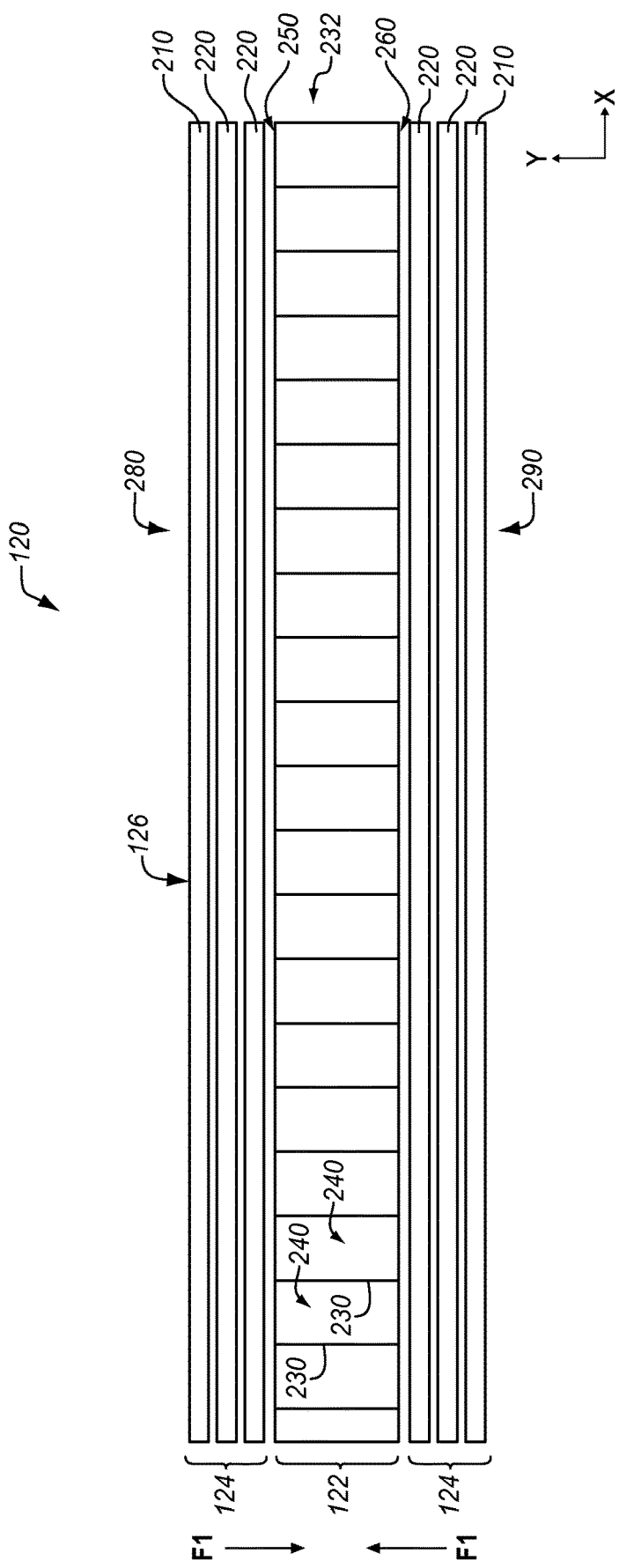
FIG. 2 is a front view illustrating a core and facesheets of a composite panel in an exemplary embodiment.

FIGS. 2-7 illustrate further details of the various components utilized for blade-and-slot system 100. For example, FIG. 2 is a front view illustrating core 122 and facesheets 124 of composite panel 120 in an exemplary embodiment. FIG. 2 corresponds with view arrows 2 of FIG. 1. FIG. 2 illustrates that each facesheet 124 may include one or more layers 220 of composite. Note that FIG. 2 is not drawn to scale and is drawn in a slightly exploded view. The layers 220 of composite may comprise, for example, multiple layers of Fiber Reinforced Polymer (FRP), such as fiberglass reinforced polymer or Carbon Fiber Reinforced Polymer (CFRP). Each layer 220 may exhibit strands of fiber that are oriented parallel with each other and in-plane within layer 220. Furthermore, different layers may exhibit different fiber orientations. This substantially increases the strength of each facesheet with respect to lateral forces that are applied in-plane along surface 126. In this embodiment, each facesheet 124 further includes a finish layer 210. Finish layer 210 may enhance the aesthetic quality of a facesheet 124, and may comprise a Polyvinyl Fluoride (PVF) material such as TEDLAR. Finish layer 210 is not necessary in all applications and may be foregone entirely in some embodiments. One facesheet 124 covers a top 250 of core 122, and another facesheet 114 covers a bottom 260 of core 122. Top 280 and bottom 290 of composite panel 120 are also illustrated.

FIG. 2 further illustrates core 122, which resists vertical crushing forces (F1) applied to composite panel 120. In this embodiment, core 122 includes walls 230 (e.g., composite walls), which subdivide core 122 into a grid 232 of cells 240 that extend in-plane. Walls 230 may form a square grid, diamond grid, hexagonal "honeycomb" grid, etc. Because walls 230 extend vertically (along Y), grid 232 resists crushing forces (i.e., along Y) applied to composite panel 120. Meanwhile, bending force resistance is provided by the spacing apart of facesheets 124, and by preventing shear between facesheets 124 and the core 122. Each cell 240 may be hollow, and may extend from top 250 of core 122 to bottom 260 of core 122. Composite panel 110 may exhibit a similar composition to that of composite panel 120. In further embodiments core 122 comprises a solid, stiff, and/or rigid open or closed cell foam. In such embodiments, cells 240 may comprise voids within the foam, and walls 230 may, instead of being vertical, be amorphous in form. Core 112 may also or alternatively include foam as desired.

Figure 3:
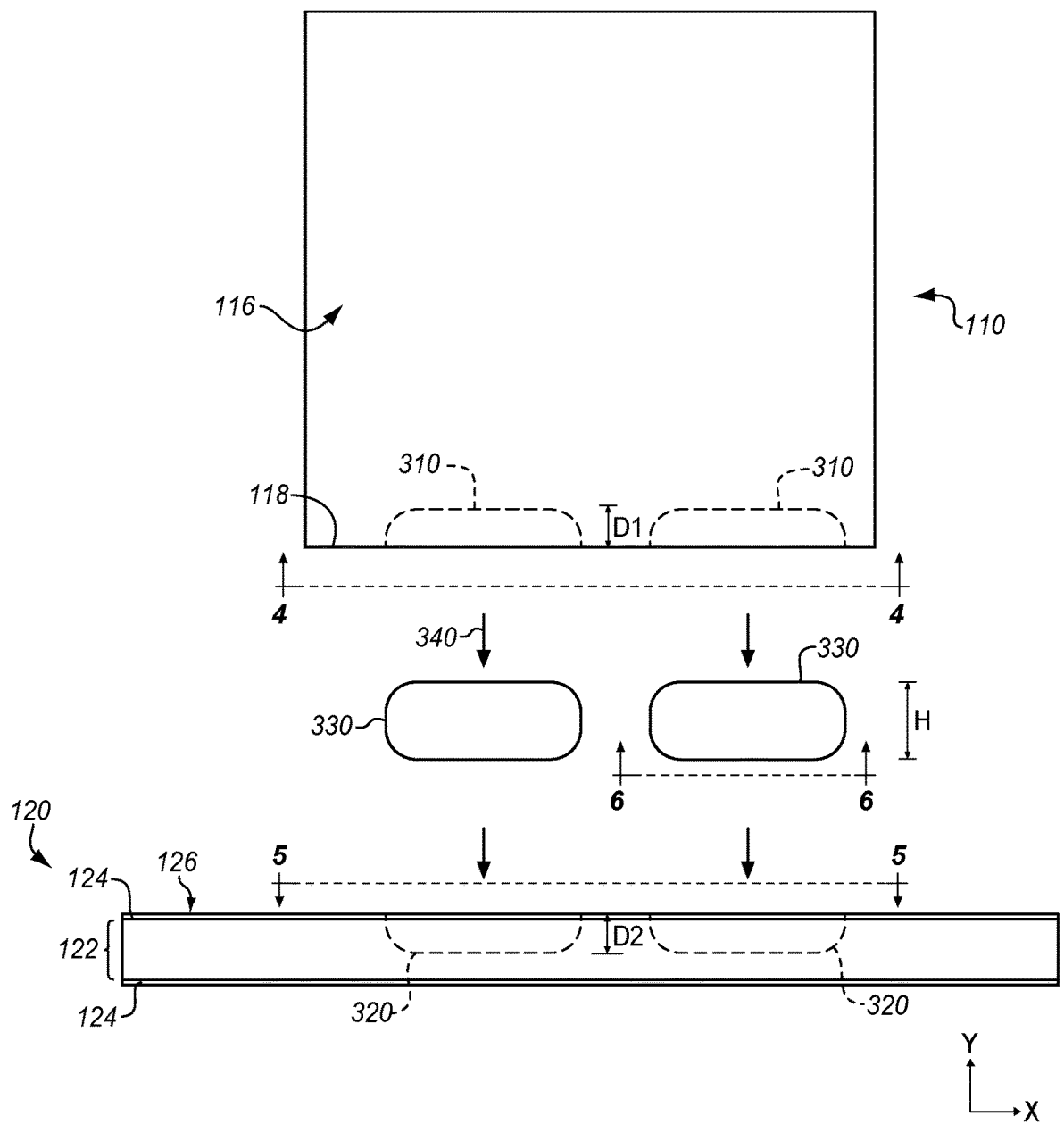
FIG. 3 is a front view illustrating assembly of the composite panels of FIG. 1 in an exemplary embodiment.

FIG. 3 is a front view illustrating assembly of the composite panels of FIG. 1 in an exemplary embodiment. FIG. 3 illustrates that composite panel 110 includes a first slot 310 having a predetermined depth D1, and that composite panel 120 includes a second slot 320 having a predetermined depth D2. In this embodiment, slot 310 penetrates only into core 112 of composite panel 110, while slot 320 penetrates through a facesheet 124 as well as into core 122 of composite panel 120. In one embodiment, depth D2 is equal to the thickness of one facesheet 124, plus the thickness of core 122. Depths D1 and D2 need not be equal. In some embodiments, depth D1 is substantially deeper than D2 (e.g., one and a half to four times as deep, such as twice as deep). This increases the amount of structural strength when panel 110 and panel 120 are joined. That is, when an insertable blade 330 (also referred to as a "blade") penetrates deeper into a slot, there is more material at blade 330 which will be bound to the core (112, 122), which increases the mechanical strength of the resulting joint. Blades 330 are inserted into slots 310 and 320 and affixed in place via an adhesive. The height (H) of each blade 330 may correspond with the combined depth of a slot 310 and a slot 320. Further details of slot 310 and slot 320 are provided in FIGS. 4-5. Note that while slots 310, slot 320 and blade 330 are shown as having rounded corners, they may have square corners in further embodiments.

FIG. 4 is a bottom view of composite panel 110 of FIG. 3 in an exemplary embodiment. Specifically, FIG. 4 corresponds with view arrows 4 of FIG. 3. Slots 310 penetrate through walls 230 and extend into composite panel 110 a depth D1 along Y (see FIG. 1). That is, slots 310 penetrate core 112 perpendicular to the walls of core 112 and substantially parallel to facesheets 114. Slots 310 have a length (L) and a thickness (T). T may be smaller than the thickness of core 122 and/or panel 120. Thus, in an embodiment where each composite panel has a thickness of between one quarter of an inch and one inch, T may be between fifty and one hundred and fifty thousandths of an inch. L may be any suitable length. In further embodiments, slots 310 and slots 320 may be aligned with, staggered, or offset with respect to each other and/or centerline 490 of core 112, such that they each occupy a different position along Z. In other embodiments, slots 310 and/or slots 320 may be arranged, angled, or located other than parallel to centerline 490 of facesheets 114. It is even possible for slots to be arranged/located on either side of centerline 490 running through core 112 and parallel to facesheets 114. In some embodiments slots 310 are further arranged/located to directly border/contact one or more facesheets 114, may be located directly in contact with one or more facesheet 114, and may be in line with facesheet 114.

FIG. 5 is a top view of composite panel 120 of FIG. 3 in an exemplary embodiment. Specifically, FIG. 5 corresponds with view arrows 5 of FIG. 3. FIG. 5 includes slots 320, which may have the same thickness (T2) and length as slots 310, or a different thickness and length than slots 310. Slots 320 penetrate through a facesheet 124 of panel 120 perpendicular to the facesheet 124, and also at least partially penetrate core 122 (as shown in FIG. 2). In embodiments where the dimensions of slots 310 and slots 320 differ, blades 330 may be sized to accommodate these varying dimensions.

A thickness (e.g., T, T2) of slots 310 and slots 320 may be less thick than a thickness (T3, FIG. 6) of blades 330 (in order to facilitate a friction fit), or may be more thick than a thickness of blades 330 (in order to facilitate ease of installation).

In some embodiments, the combined depth (D1+D2, FIG. 3) of a slot 310 and a slot 320 corresponds with a height (H, FIG. 3) of an individual blade 330. In this manner, sufficient material is removed to enable the insertion of a blade 330, without removing more material than needed.

Figure 6:
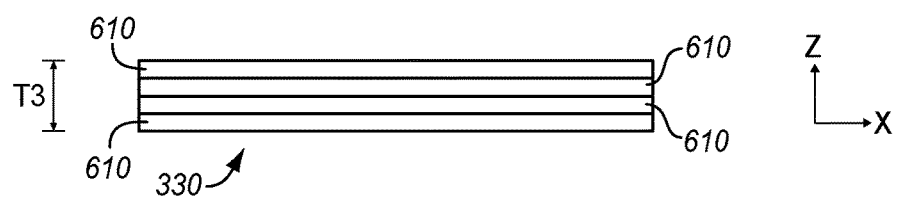
FIG. 6 is a bottom view of an insertable blade of FIG. 3 in an exemplary embodiment.

FIG. 6 is a bottom view of blade 330 of FIG. 3 in an exemplary embodiment. Specifically, FIG. 6 corresponds with view arrows 6 of FIG. 3. FIG. 6 illustrates that each blade 330 may comprise one or multiple layers 610 of composite material, depending on a desired thickness of blade 330. For example, each blade 330 may be made from the same material as a facesheet 114. The fiber orientations of different layers 610 may vary in order to enhance the strength of blade 330 with respect to forces applied from different directions. In further embodiments, blades 330 may be made from metal or a rigid plastic. Blade 330 is thinner (i.e., along Z) than composite panel 110 and composite panel 120. Blade 330 may have a thickness corresponding with a thickness of slot 310 and a thickness of slot 320. In further embodiments, blade 330 includes additional features to enhance its strength, such as ridges or texture that increase contact area with an adhesive.

With basic illustrations of the components of a blade-and-slot system described above, further details are now provided of how composite panel 110 and second composite panel 120 may be joined.

Figure 7:
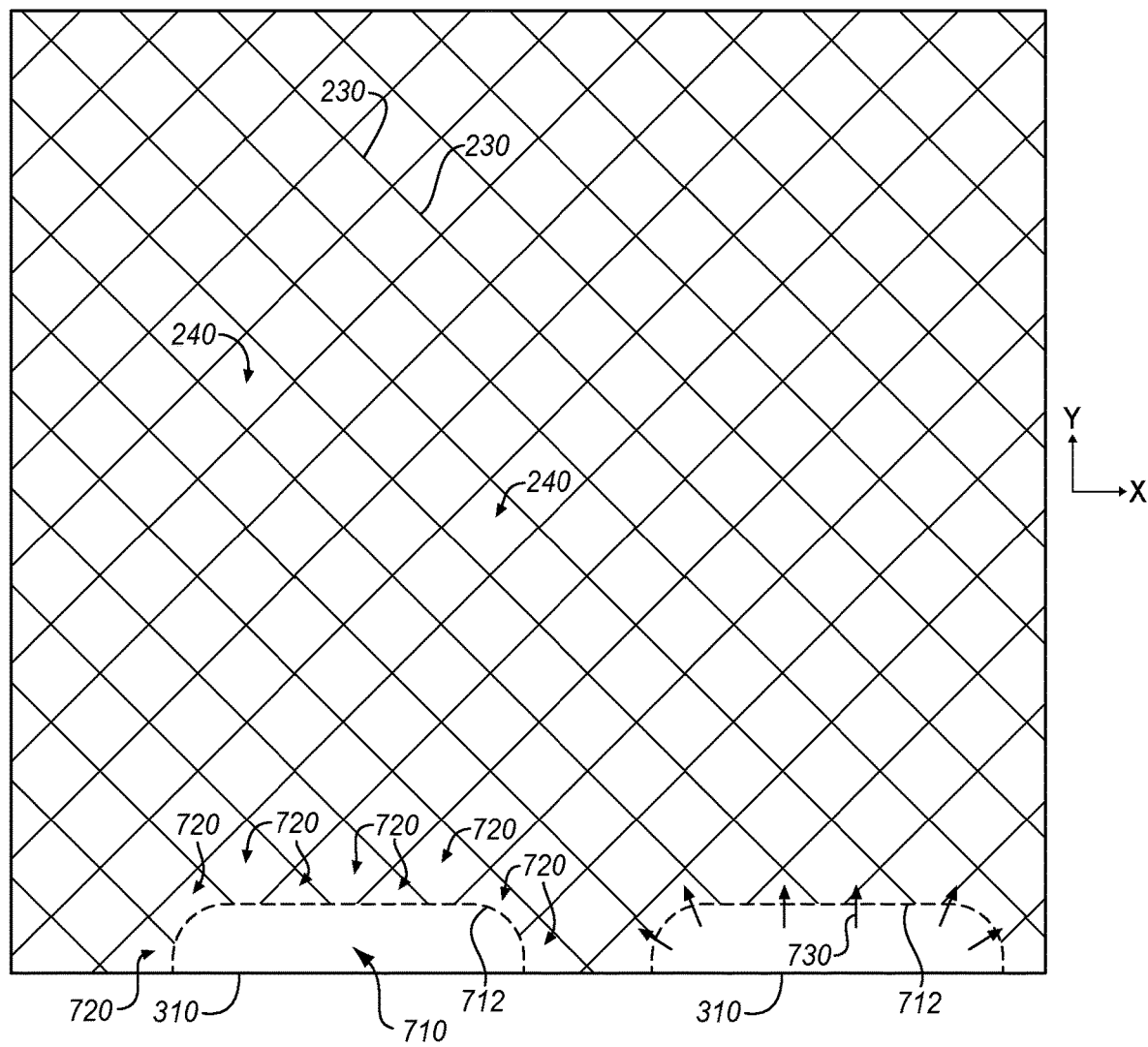
FIG. 7 is a cut-through front view of the first composite panel of FIG. 3 in an exemplary embodiment.

FIG. 7 is a cut-through front view of composite panel 110 of FIG. 3 in an exemplary embodiment. In this embodiment, the locations of cuts forming slots 310 are illustrated with dotted lines 712. Dotted lines 712 in FIG. 7 therefore do not illustrate walls 230, but rather are boundaries indicating the endpoints of cuts that have been made into walls 230 in order to form volume 710. Because the cuts penetrate through a plurality of walls 230 and into cells 240, additional volumes 720 are exposed by the cuts. These additional volumes 720 help to facilitate the penetration of adhesive into slots 310, which in turn enhances the overall strength of bonding between composite panel 110 and composite panel 120. That is, adhesive follows flow pathways indicated by arrows 730 when a blade is inserted into a slot 310 that has already been filled with adhesive.

Figure 8:
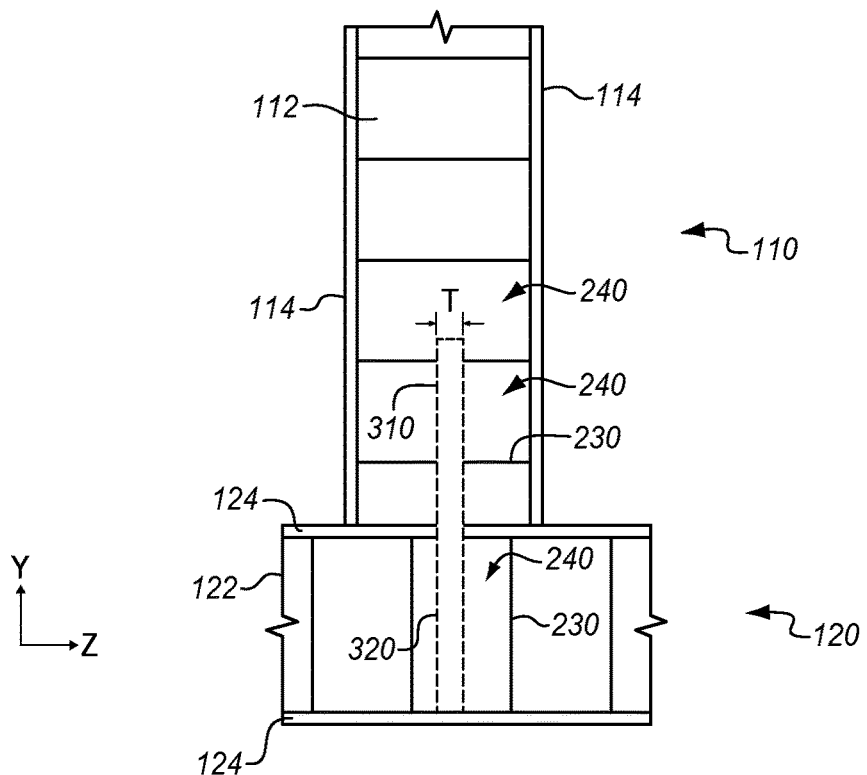
FIGS. 8-9 are cut-through side views of the first composite panel and second composite panel of FIG. 3 being affixed together by a blade in an exemplary embodiment.
Figure 9:
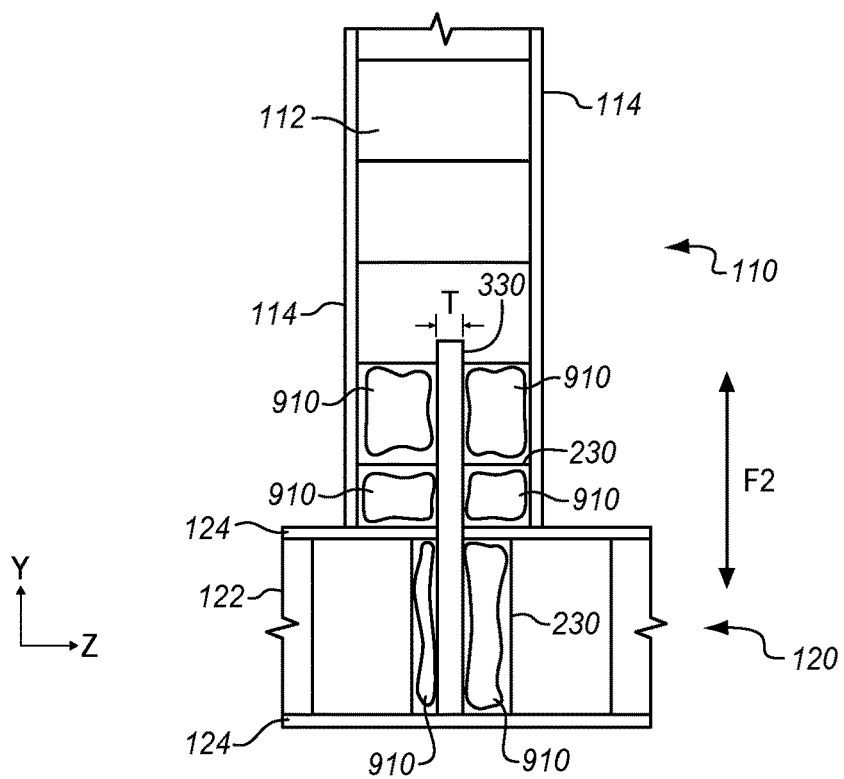

With a description of various slots, blades, and composite panels provided above, FIGS. 8-9 provide cut-through side views of composite panel 110 and composite panel 120 of FIG. 3 being affixed together by a blade 330 in an exemplary embodiment. FIGS. 8-9 correspond with view arrows 8 of FIG. 1. Specifically, FIG. 8 illustrates a "dry fit" alignment of first composite panel 110 with second composite panel 120, while FIG. 9 illustrates composite panel 110 and composite panel 120 being permanently affixed via use of blade 330 and adhesive 910. Adhesive 910 enters not just slots 310 and 320, but also any cells 240 that have been cut into by slots 310 and 320. This enhances the overall bond strength between composite panel 110 and composite panel 120. Adhesive 910 may for example fill cells 240, touching both blade 330 and cell walls 230. After adhesive 910 has dried, panel 110 is permanently affixed/joined to composite panel 120. Hence, composite panel 110 and composite panel 120 strongly resist pull-out forces F2.

The bond between composite panel 110 and composite panel 120 is unique in that it utilizes a blade-and-slot geometry in an unexpected arrangement. That is, since slot 310 penetrates perpendicularly into core 112, little material interference initially exists between blade 330 and walls 230 of composite panel 110. However, because adhesive 910 is pushed into cells 240 by the insertion of blade 330, adhesive 910 provides additional structural strength that prevents dis-bonding. In some embodiments, adhesive 910 within a slot may further flow outward along Z into contact with facesheets 114 when blade 330 is inserted. Thus, blade 330 may bond to facesheets 114, even further enhancing joint strength by enabling facesheets 114 to bear pull-out forces F2.

Illustrative details of the operation of the blade-and-slot system of FIGS. 1-9 will be discussed with regard to FIG. 10. Assume, for this embodiment, that a technician wishes to join two composite panels that have complementary slots.

Figure 10:
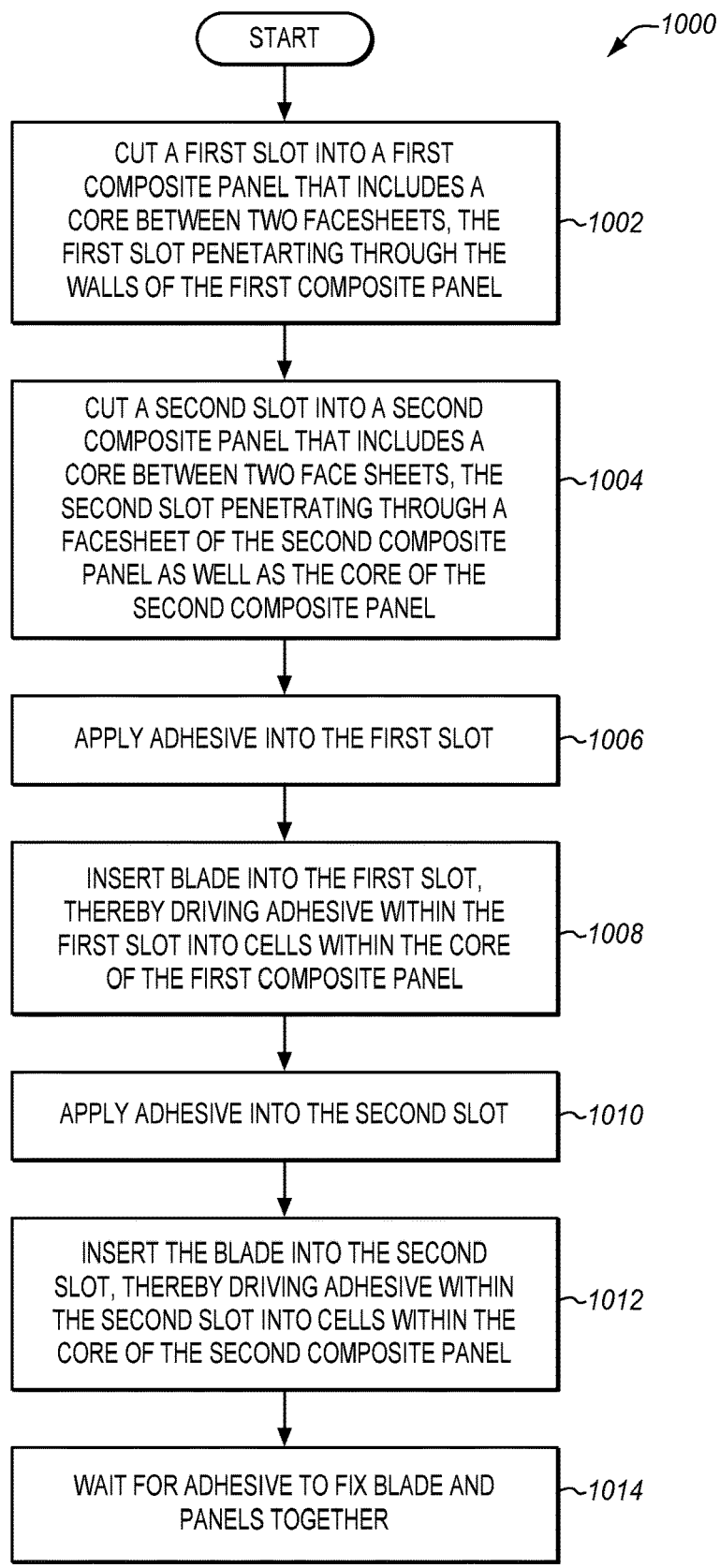
FIG. 10 is a flowchart illustrating a method of utilizing a blade-and-slot system in an exemplary embodiment.

FIG. 10 is a flowchart illustrating a method 1000 for utilizing a blade-and-slot system in an exemplary embodiment. The steps of method 1000 are described with reference to blade-and-slot system 100 of FIG. 1, but those skilled in the art will appreciate that method 1000 may be performed in other blade-and-slot systems. The steps of the flowcharts described herein are not all inclusive and may include other steps not shown. The steps described herein may also be performed in an alternative order.

Method 1000 may initiate with the acquisition of first composite panel 110, and cutting a first slot 310 into composite panel 110 (step 1002). First slot 310 penetrates through walls 230 of composite panel 110. Second composite panel 120 is also acquired, and slot 320 is cut into composite panel 120 (step 1004). Slot 320 penetrates through facesheet 124 of composite panel 120, as well as penetrating through walls 230 of composite panel 120. Composite panel 110 and composite panel 120 may include cores with evenly spaced vertical walls, or may comprise solid foams having amorphous walls as mentioned above. For example, core 112 may comprise a solid foam of amorphous walls 230 defining cells 240, or core 112 may include vertical walls 230 that define a grid 232 of cells 240. That is, walls 230 may subdivide core 112 into grid 232. First composite panel 110 further includes a slot 310 that penetrates through grid 232 and/or cells 240. For example, slot 310 may penetrate through walls 230 at an angle that is perpendicular to walls 230. In some embodiments, method 1000 may further comprise cutting slot 310 at panel 110, and cutting slot 320 at panel 120.

With the panels acquired, adhesive 910 is applied to slot 310 (step 1006). For example, adhesive 910 may be applied until slot 310 is filled with adhesive 910. Because adhesive 910 may be substantially tacky and/or viscous, air pockets may remain within cells 240 adjacent to slot 310, even after slot 310 has been filled with adhesive 910. This may also be referred to as "potting" core 112.

Blade 330 is inserted into slot 310 (step 1008). The action of inserting blade 330 drives adhesive 910 within slot 310 deeper into cells 240 within core 112 of panel 110. That is, adhesive 910 is driven into volumes 710 illustrated in FIG. 7, which may even cause adhesive 910 to be driven against facesheets 114. Depending on the thickness of blades 330, in some embodiments blades 330 do not contact facesheets 114 when inserted into composite panel 110.

Adhesive 910 is applied to second slot 320 of second composite panel 120 (step 1010). Method 1000 further includes inserting blade 330 into slot 320, thereby driving adhesive 910 within slot 320 into cells within the core of the second composite panel (step 1012). This may further comprise waiting for adhesive 910 to fix blade 330 and the panels together (step 1014). In this manner, composite panel 110 and composite panel 120 are affixed perpendicular to each other after blade 330 has been inserted into slot 310 and slot 320.

Method 1000 provides a substantial benefit in that it enables composite panels to be affixed cleanly to form joints. The slots are advantageously placed in locations which would normally be expected to exhibit mechanical weakness, yet surprisingly overcomes this deficiency by pushing adhesive 910 into empty volumes that have been cut into by slots 310 and 320. Furthermore, composite panel 110 and composite panel 120 provide a flow pathway for adhesive 910 that is entirely internal to the panels being united (as indicated by arrows 730), and therefore prevents excess adhesive 910 from flowing out of the panels. However, in some embodiments it may be desirable for insertion of blade 330 into a slot 310 to cause excess adhesive 910 to flow out (i.e., "squeeze out") of slot 310, which may be indicative of having a sufficient amount of adhesive 910 in the joint. In environments where a flammable adhesive 910 is utilized, this is highly advantageous because it reduces the flammability of the resulting joint.

Figure 11:
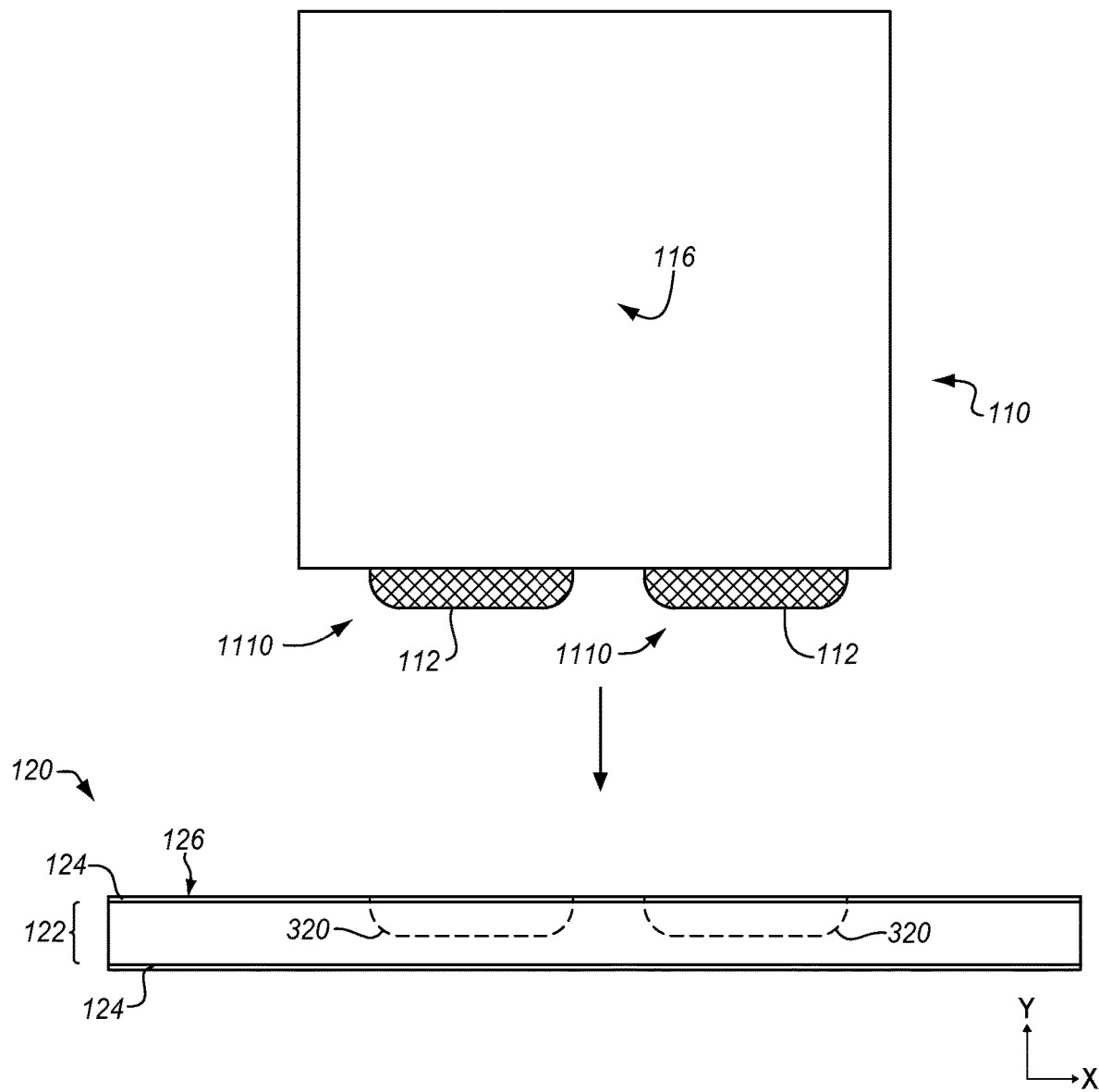
FIG. 11 is a diagram illustrating a further blade-and-slot system in an exemplary embodiment.

In even further embodiments as illustrated in FIG. 11, a portion 1110 of core 112 is extended downward from composite panel 110. This extending portion 1110 of core 112 may be placed into a corresponding slot 320 at composite panel 120. This configuration may further facilitate formation of a joint as desired.

EXAMPLES

In the following examples, additional processes, systems, and methods are described in the context of a blade-and-slot system for bonding composite panels.

Figure 12:
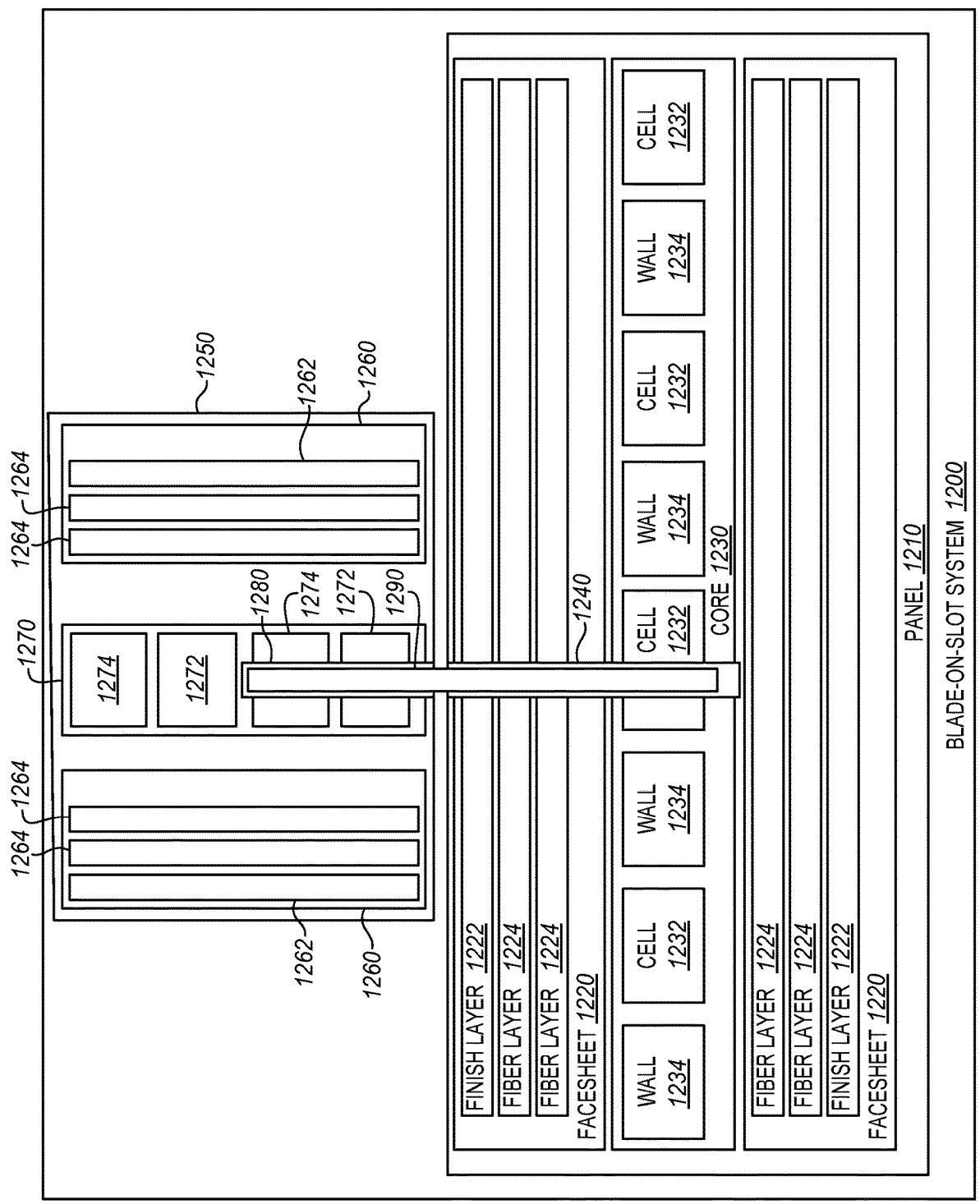
FIG. 12 is a block diagram of a blade-and-slot system in an exemplary embodiment.

FIG. 12 is a block diagram of a blade-and-slot system 1200 in an exemplary embodiment. As shown in FIG. 12, panel 1210 and panel 1250 have been bonded together. Panel 1210 includes facesheets 1220, which each include one or more plies (fiber reinforced layers) 1224 and a finish layer 1222 (e.g., TEDLAR). Core 1230 of panel 1210 includes cells 1232 defined by walls 1234. Slot 1240 penetrates through a facesheet 1220 of panel 1210 and through core 1230. Meanwhile, panel 1250 includes facesheets 1260 which include one or more fiber layers 1264 and a finish layer 1262. Core 1270 of panel 1250 includes cells 1272 and walls 1274. Slot 1280 penetrates through core 1270. Blade 1290 has been inserted into slot 1240 and slot 1280, and beneficially maintains bond strength between panel 1210 and panel 1250. In further embodiments, core 1230 may comprise a foam as discussed above.

Figure 13:
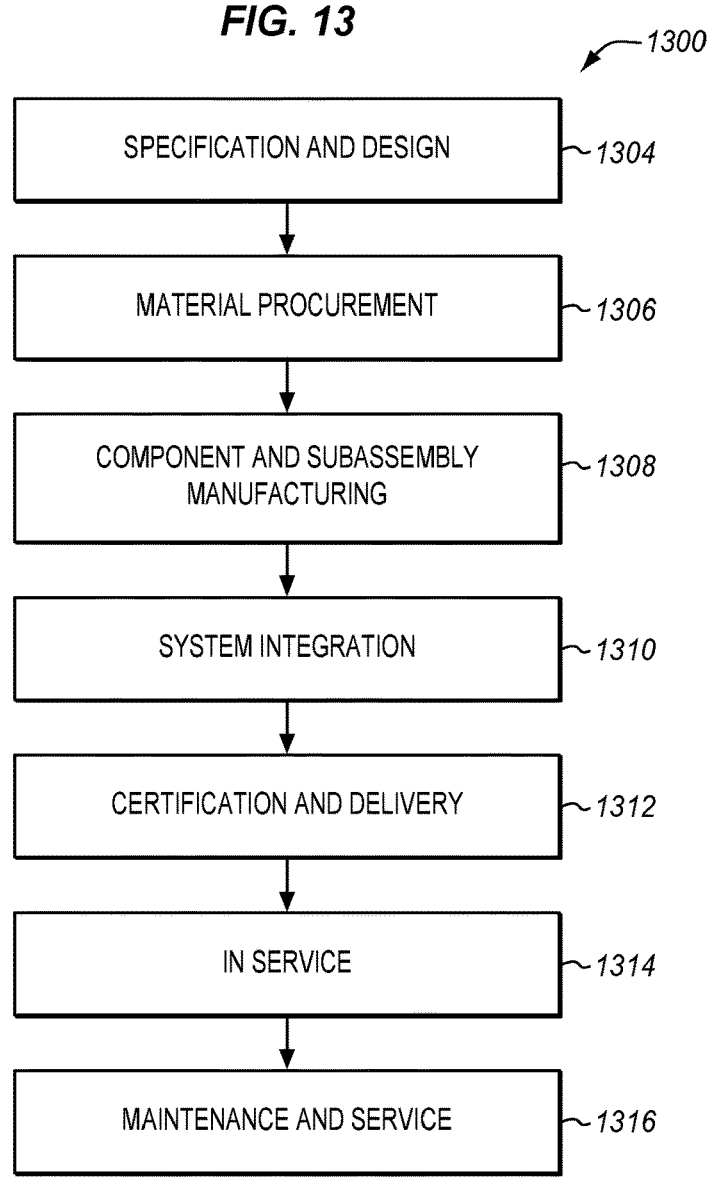
FIG. 13 is a flow diagram of aircraft production and service methodology in an exemplary embodiment.
Figure 14:
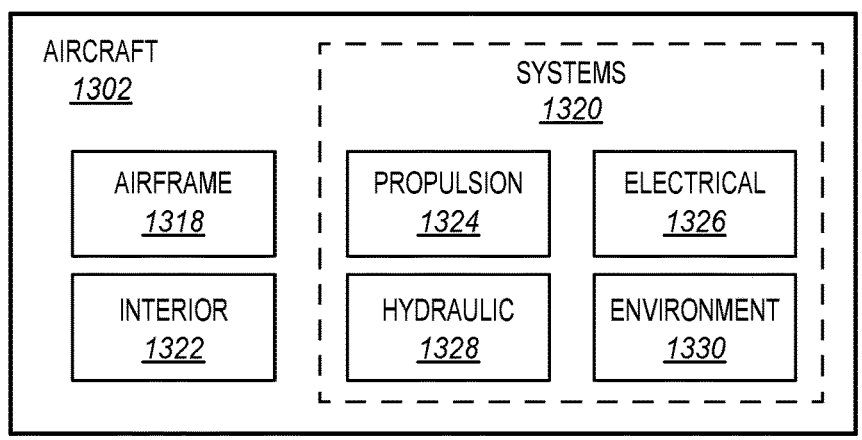
FIG. 14 is a block diagram of an aircraft in an exemplary embodiment.

Referring more particularly to the drawings, embodiments of the disclosure may be described in the context of an aircraft manufacturing and service method 1300 as shown in FIG. 13 and an aircraft 1302 as shown in FIG. 14. During pre-production, exemplary method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine maintenance and service 1316 (which may also include modification, reconfiguration, refurbishment, and so on). Apparatus and methods embodied herein may be employed during any one or more suitable stages of the production and service method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion 1324, electrical 1326, hydraulic 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by exemplary method 1300 may include an airframe 1318 with a plurality of systems 1320 and an interior 1322. Examples of high-level systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1300. For example, components or subassemblies corresponding to production stage 1308 may be fabricated or manufactured in a manner similar to components or subassemblies produced while the aircraft 1302 is in service. Also, one or more apparatus embodiments, method embodiments, or a combination thereof may be utilized during the production stages 1308 and 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation, to maintenance and service 1316. For example, the techniques and systems described herein may be used for steps 1306, 1308, 1310, 1314, and/or 1316, and/or may be used for airframe 1318 and/or interior 1322. These techniques and systems may even be utilized for systems 1320, including for example propulsion 1324, electrical 1326, hydraulic 1328, and/or environmental 1330.

In one embodiment, panels 110 and 120 comprise a portion of interior 1322, and are manufactured during component and subassembly manufacturing 1308. The panels may then be assembled via blade-and-slot system 100 into an aircraft in system integration 1310, and then be utilized in service 1314 until wear renders the composite panels unusable. Then, in maintenance and service 1316, the composite panels may be discarded and replaced with newly manufactured panels. Blade-and-slot techniques may be utilized throughout component and subassembly manufacturing 1308 in order to assemble the new panels.

Although specific embodiments are described herein, the scope of the disclosure is not limited to those specific embodiments. The scope of the disclosure is defined by the following claims and any equivalents thereof.

What is claimed is:

1. A method comprising:
cutting a first slot into a first composite panel that includes a core between two facesheets, the first slot penetrating through the core of the first composite panel;
cutting a second slot into a second composite panel that includes a core between two facesheets, the second slot penetrating through a facesheet of the second composite panel as well as the core of the second composite panel, wherein each core comprises walls that define a grid of hollow cells;
inserting a blade into the first slot;
inserting the blade into the second slot; and
applying adhesive within at least one of the first and second slots.

2. The method of claim 1 further comprising:
driving adhesive into cells within the core of the first composite panel; and
driving adhesive into cells within the core of the second composite panel.

3. The method of claim 1 further comprising:
applying adhesive into the first slot by filling the first slot with adhesive.

4. The method of claim 1 wherein:
inserting the blade into the first slot causes adhesive to squeeze out of the first slot.

5. The method of claim 1 further comprising:
locating the first slot at a centerline of the core of the first composite panel.

6. The method of claim 1 further comprising:
locating the first slot offset from a centerline of the core of the first composite panel.

7. The method of claim 1 further comprising:
locating the first slot adjacent to a facesheet of the first composite panel.

8. The method of claim 1 further comprising:
locating the first slot angled with respect to a centerline of the core of the first composite panel.

9. The method of claim 1 further comprising:
locating the first slot in line with a facesheet of the first composite panel.

10. The method of claim 1 further comprising:
arranging the first panel and the second panel perpendicular to each other prior to inserting the blade into the first slot and the second slot.

11. The method of claim 1 further comprising:
applying adhesive into the first slot; and
applying adhesive into the second slot.

12. An apparatus comprising:
a first composite panel and a second composite panel, each comprising:
a first facesheet that extends laterally across a top of the panel;
a second facesheet that extends laterally across a bottom of the panel; and
a core that separates the first facesheet and the second facesheet, wherein each core comprises walls that define a grid of hollow cells;
a blade that occupies a first slot that penetrates laterally through the core of the first composite panel between the facesheets of the first composite panel
the blade further occupies a second slot that penetrates vertically through the first facesheet of the second composite panel into the core of the second composite panel; and
adhesive that secures the blade into the first slot and the second slot.

13. The apparatus of claim 12 wherein:
the first slot is offset from a centerline of the core of the first composite panel.

14. The apparatus of claim 12 wherein:
the first slot contacts at least one of the facesheets of the first composite panel.

15. The apparatus of claim 12 wherein:
the first slot is at an angle from a centerline of the core of the first composite panel.

16. The apparatus of claim 12 wherein:
at least one of the cores comprises a foam.

17. The apparatus of claim 12 wherein:
the first slot is aligned with a centerline of the first composite panel.

18. The apparatus of claim 12 wherein:
the first slot and second slot have a combined depth at least equal to a height of the blade.

19. The apparatus of claim 12 wherein:
the first slot has a thickness less than a thickness of the blade.

20. The apparatus of claim 12 wherein:
the first slot has a thickness greater than a thickness of the blade.

21. The apparatus of claim 12 wherein:
the first slot, second slot, and blade have square corners.

22. The apparatus of claim 12 wherein:
the first slot, second slot, and blade have round corners.

23. The apparatus of claim 12 wherein:
the first slot is in line with a facesheet of the first composite panel.

24. A system comprising:
a first composite panel and a second composite panel, each comprising:
a first facesheet that extends laterally across a top of the panel;
a second facesheet that extends laterally across a bottom of the panel; and
a core that separates the first facesheet and the second facesheet, wherein each core comprises walls that define a grid of hollow cells;
a first slot that penetrates laterally through cells of the core of the first composite panel between the facesheets of the first composite panel, that has a thickness less than a thickness of the first composite panel, and that extends a predetermined depth into the first composite panel;
a second slot that penetrates vertically through the first facesheet and the core of the second composite panel into cells of the second composite panel, and that extends a predetermined depth into the composite panel;
a blade dimensioned for insertion into the first slot and the second slot; and
adhesive that secures the blade into the first slot and the second slot.

25. The system of claim 24 further comprising:
adhesive inserted into the first slot that occupies cells that have been penetrated by the first slot; and
adhesive inserted into the second slot that occupies cells that have been penetrated by the second slot.

26. The system of claim 24 wherein:
the blade is inserted in the first slot and inserted in the second slot, thereby affixing the first composite panel and the second composite panel.

27. The system of claim 24 wherein:
the first slot is offset from a centerline of the core of the first composite panel.

28. The system of claim 24 wherein:
the first slot contacts at least one of the facesheets of the first composite panel.

29. The system of claim 24 wherein:
the first slot is at an angle from a centerline of the core of the first composite panel.

30. The system of claim 24 wherein:
at least one of the cores comprises a foam.

31. The system of claim 24 wherein:
the first slot is aligned with a centerline of the first composite panel.

32. The system of claim 24 wherein:
the first slot and second slot have a combined depth at least equal to a height of the blade.

33. The system of claim 24 wherein:
the first slot has a thickness less than a thickness of the blade.

34. The system of claim 24 wherein:
the first slot has a thickness greater than a thickness of the blade.

35. The system of claim 24 wherein:
the first slot, second slot, and blade have square corners.

36. The system of claim 24 wherein:
the first slot, second slot, and blade have square corners.

37. The system of claim 24 wherein:
the first slot is in line with a facesheet of the first composite panel.

38. An apparatus comprising:
a first composite panel comprising:
a first facesheet that extends laterally across a top of the first composite panel;
a second facesheet that extends laterally across a bottom of the first composite panel;
a first core separating the first facesheet and the second facesheet; and
a portion of the first core that extends beyond the first facesheet and the second facesheet at an end of the first composite panel, and extends a predetermined depth beyond the end of the panel; and
a second composite panel comprising:
a third facesheet that extends laterally across a top of the second composite panel;
a fourth facesheet that extends laterally across a bottom of the second composite panel;
a second core separating the third facesheet and the fourth facesheet;
wherein the first and second cores comprise walls that define a grid of hollow cells; and
a slot penetrating through the third facesheet as well as penetrating through the second core,
the portion of the first core is inserted into the slot and affixed to the slot via adhesive.

39. The apparatus of claim 38 wherein:
the first core comprises a solid foam.

* * * * *